United States Patent
Luby et al.

(10) Patent No.: US 8,239,522 B1
(45) Date of Patent: Aug. 7, 2012

(54) DYNAMIC VARIABLES FOR TRACKING WIRELESS DEVICE WEBSITE USAGE

(75) Inventors: Chris Luby, Lehl, UT (US); Brett Michael Error, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 351 days.

(21) Appl. No.: 11/939,748

(22) Filed: Nov. 14, 2007

Related U.S. Application Data (60) Provisional application No. 60/866,093, filed on Nov. 16, 2006.

(51) Int. Cl.
- *G06F 11/34* (2006.01)
- *G06F 17/30* (2006.01)
- *G06F 9/00* (2006.01)

(52) U.S. Cl. .................. 709/224; 707/999.201; 719/328
(58) Field of Classification Search .................... 709/224
See application file for complete search history.

(56) References Cited

U.S. PATENT DOCUMENTS

| | | | | |
|---|---|---|---|---|
| 6,112,240 | A * | 8/2000 | Pogue et al. | 709/224 |
| 7,483,983 | B1 * | 1/2009 | Bonefas et al. | 709/226 |
| 7,587,486 | B2 * | 9/2009 | Taniguchi | 709/224 |
| 7,590,729 | B2 * | 9/2009 | Abjanic et al. | 709/224 |
| 2003/0046385 | A1 * | 3/2003 | Vincent | 709/224 |
| 2003/0115378 | A1 * | 6/2003 | Zondervan et al. | 719/328 |
| 2003/0154289 | A1 * | 8/2003 | Williamson et al. | 709/227 |
| 2004/0059746 | A1 | 3/2004 | Error et al. | |
| 2004/0098229 | A1 | 5/2004 | Error et al. | |
| 2004/0122943 | A1 | 6/2004 | Error et al. | |
| 2004/0221033 | A1 * | 11/2004 | Davis et al. | 709/224 |
| 2004/0254942 | A1 | 12/2004 | Error et al. | |
| 2005/0086344 | A1 * | 4/2005 | Suesserman | 709/227 |
| 2005/0097008 | A1 * | 5/2005 | Ehring et al. | 705/26 |
| 2005/0114510 | A1 | 5/2005 | Error et al. | |
| 2005/0138571 | A1 * | 6/2005 | Keskar et al. | 715/789 |
| 2005/0216844 | A1 | 9/2005 | Error et al. | |
| 2006/0117073 | A1 * | 6/2006 | Bosworth et al. | 707/999.201 |
| 2006/0123340 | A1 | 6/2006 | Bailey et al. | |
| 2006/0149728 | A1 | 7/2006 | Error et al. | |
| 2006/0234548 | A1 * | 10/2006 | Qing et al. | 439/587 |
| 2006/0265670 | A1 * | 11/2006 | Cohen et al. | 715/854 |
| 2006/0277087 | A1 | 12/2006 | Error | |
| 2006/0277198 | A1 | 12/2006 | Error et al. | |
| 2006/0277211 | A1 | 12/2006 | Error | |
| 2006/0277212 | A1 | 12/2006 | Error | |

(Continued)

OTHER PUBLICATIONS

SiteCatalyst Implementation Manual, downloaded Oct. 18, 2006 from http://w2.byuh.edu/webmasters/, copyright Oct. 28, 2005.

*Primary Examiner* — Ashok Patel
*Assistant Examiner* — Joseph Gazda
(74) *Attorney, Agent, or Firm* — Robert C. Kowert; Meyertons, Hood, Kivlin, Kowert & Goetzel, P.C.

(57) ABSTRACT

Tools and techniques are provided to assist in gathering web analytics data from wireless devices and in other configurations where passing data to an analytics server in a web-beacon query string has been difficult due to lack of an embedded scripting language and/or inaccessibility of desired data values. A dynamic variable specification is built on the web-reading device, including variables with associated data sources, operators, and literal values. The dynamic variable specification is sent to an analytics server, where an interpreter gathers data values and assigns them to variables.

18 Claims, 2 Drawing Sheets

U.S. PATENT DOCUMENTS

| | | |
|---|---|---|
| 2006/0277585 A1 | 12/2006 | Error et al. |
| 2007/0011304 A1 | 1/2007 | Error |
| 2007/0100811 A1 | 5/2007 | Error et al. |
| 2007/0100992 A1 | 5/2007 | Wong et al. |
| 2007/0100993 A1 | 5/2007 | Malhotra et al. |
| 2007/0118392 A1 | 5/2007 | Zinn et al. |
| 2007/0168255 A1 | 7/2007 | Zinn et al. |
| 2007/0244750 A1* | 10/2007 | Grannan et al. ............... 705/14 |
| 2007/0250618 A1* | 10/2007 | Hammond .................. 709/224 |
| 2007/0275701 A1* | 11/2007 | Jonker ...................... 455/414.1 |
| 2008/0040473 A1* | 2/2008 | Larsson et al. ............... 709/224 |
| 2008/0059566 A1* | 3/2008 | Korovkin et al. ............ 709/203 |
| 2008/0104224 A1* | 5/2008 | Litofsky et al. .............. 709/224 |

\* cited by examiner

DYNAMIC VARIABLES FOR TRACKING WIRELESS DEVICE WEBSITE USAGE

RELATED APPLICATION

The present application claims priority to, and incorporates by reference, U.S. provisional patent application Ser. No. 60/866,093, filed Nov. 16, 2006.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Website usage via browsers is regularly tracked and analyzed by commercially available web analytics services, which gather detailed data about web page usage, and to some extent about particular website users. Entities which provide other entities with web analytics services are referred to as "analytics providers". One leading web analytics provider is Omniture, Inc., of Orem, Utah, the owner of the present invention. Omniture provides web analytics technology under its well-known mark SiteCatalyst™. All other marks used herein are property of their respective owners.

Web analytics data can be collected from many sources, such as by reading server logs or by using web-beacons. Web-beacons are small image requests placed in a web page to cause communication between the user's device and a server. The server may be controlled by the analytics provider, by the vendor whose website contains the web-beacons, or by another party. Web-beacons are also known as clear GIFs, web bugs, image requests, or pixel tags. Web-beacons can be used for advertising, behavioral targeting, and other processes, to gather information a visits to websites. Web-beacons are commonly used by analytics providers to gather analytics data.

In particular, in some known web-beacon-based analytics systems, a web-beacon is pasted into website pages to cause communication with a core JavaScript file on the customer server; web-beacons may also be hosted on other servers, such as analytics provider (Omniture) servers. The pasted web-beacon code is served on each HTML page the customer wishes to track. The core JavaScript file is effectively included via the pasted code.

Some cell phones and other wireless devices can be configured with a web browser, RSS feed aggregator, and/or other tools for accessing web and/or other internet content without requiring the use of a browser running on an end-user's personal computer. Examples include cell phones, other mobile phones, wireless devices such as those sold under the Blackberry mark, personal digital assistants such as those sold under the Palm mark, and/or other devices, including handheld devices and others. Such wireless web devices communicate with a wireless gateway using one or more wireless communication protocols such as WAP, J2ME, I-mode, LEAP, EZWeb, and J-SkyWeb. The wireless gateway communicates in turn with the web using one or more internet protocols such as HTTP, HTTPS, XML, and RSS, among others. Browser examples may also be found on phones, running under the phone's operating system; the term "browser" is not limited to programs running on a desktop computer.

Some typical web-beacon-based web analytics products can track visitor information about a served web page by executing JavaScript code on that page that constructs a web-beacon request (usually a transparent 1x1 GIF with name-value pairs) which is sent to the designated web analytics servers. The analytics servers then collect the information from the web-beacon request, serve the GIF to the browser client and process that data for consumption by the analytics provider's customer.

As compared with browser clients on PCs, browser clients on wireless devices often involve additional steps in the process. In one scenario, for instance, a wireless device sends a WAP request to a WAP gateway/proxy, which sends an HTTP request to an origin server. The origin server sends an HTTP response to the WAP gateway/proxy, which then sends a WAP response to the wireless device.

Other concepts related to the present invention may be known, or become apparent through sources other than this background, including without limitation the references being made of record in connection with the present patent application. This background was written in hindsight, with the present invention already in mind.

SUMMARY

The present invention provides tools and techniques to facilitate web analytics when website visitors are using wireless devices, and in other situations. One embodiment includes a web analytics method in which a web-reading device sends an access node a web-beacon request associated with a dynamic variable specification. The access node forwards to an analytics data collection server the web-beacon request and the dynamic variable specification. Then the analytics data collection server interprets the dynamic variable specification. The dynamic variable specification specifies a data source, such as an HTTP/HTTPS header, posted XML content, a local or remote database, and/or an application program interface (API). The wireless access node that receives the web-beacon request and dynamic variable specification forwards them to an analytics data collection server. The dynamic variable specification syntax contains designations for variable names, operators, and literals. The analytics data collection server interprets the dynamic variable specification, by gathering the current values of specified variables from the (implicitly or expressly) specified data sources, and using them as indicated to assign values to variables in the specification's expression(s).

One embodiment provides a web analytics system, having a processor and a memory which is interoperable with the processor. Reception code configuring the memory is capable of controlling the processor to make the system receive a web-beacon request which has an associated dynamic variable specification. Interpretation code configuring the memory is capable of controlling the processor to make the system interpret the dynamic variable specification. The system may include wireless web-reading devices such as cell phones and personal digital assistants.

These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description is given with reference to the attached drawings. These drawings only illustrate selected aspects and thus do not fully determine the invention's scope.

Reference numerals to the Figures are included within the text below, but the reader is invited to initially read through the text without referring to the Figures each time a reference numeral occurs, in order to more easily gain a first impression of the embodiments discussed.

DETAILED DESCRIPTION

Introduction

The present invention provides tools and techniques for web analytics. A given embodiment may be of help with some wireless device web-reading activity, or in other situations in which it is difficult for a web-reading application program to create a desired query string to communicate values in a web-beacon request. The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

It is not necessary for every inventive embodiment or configuration to include every component shown in the figures or discussed in the text, or to include components in the same quantities and relationships shown here. The figures and textual descriptions are merely examples. Apparent inconsistencies in pieces of text used near a reference numeral should be understood as presenting alternatives, thereby broadening the meaning of the referenced item. Also, a section of text may discuss an item without reciting that item's reference numeral.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to be their own lexicographers, with respect to both coined terms and other terms.

For instance, "analytics" is used somewhat broadly herein. Analytics technology generates and/or gathers data about visitor 262 behavior in websites 250, including in some cases web page 252 visits, Flash (mark of Adobe) or other multimedia presentation interactions, RSS or other feed interactions, and/or other visitor behavior during networked presentations, in a manner similar to widely used HTML web page analytics.

The term "web" is also used broadly, to include not only the World Wide Web but also other parts of the Internet, as well as local networks that use protocols also used in the Internet, such as HTTP, HTTPS, IP, and so on.

Some Examples

Web analytics can collect information about website visitors so that the website owner may better understand and serve those visitors. Today an analytics provider can collect information that is provided in a JavaScript-constructed web beacon request. Some examples of such managed information are site path (popular sequences of web pages visited), online purchasing behavior, and website visitor technology data such as the operating system and the web browser setting used by the visitor. There are situations in which it may be desirable to pass information to the web analytics system when the request cannot be easily manipulated. This may occur, for example, if JavaScript is unavailable. It also becomes challenging to provide a smooth, easy solution for website owners and other customers (e.g., third party advertisers) when one considers the variability in headers, the inaccessibility of all header variables via JavaScript and the prospect of new devices or vendors continuing to add to the variability and volume.

The present invention provides tools and techniques for allowing web-beacon code to partially or fully specify to analytics provider servers which data should be collected, and where it is to be collected from. Web analytics can collect information about website 250 visitors 262 so that the website owner may better understand and serve those visitors. An analytics provider such as Omniture can collect 120 information that is provided in the web-beacon request. In particular, some embodiments support building a dynamic variable specification having a syntax whereby JavaScript code (or a counterpart or substitute such as ActionScript code, for instance) can indicate to the analytics data collection servers the data source(s) and data value(s) to be collected upon reception of the web-beacon request. More generally, a dynamic analytics variable specification is sent from the wireless device to the analytics data collection server for interpretation.

We consider now a sequence of three increasingly specific examples. In the most general of these examples, a method embodiment operates in an environment containing a wireless device, a wireless gateway, an analytics provider server, and an analytics data storage facility. An HTTP request for a tracking beacon comes from the wireless device, including a query string expression with one or more dynamic variables. The request goes through the wireless gateway, which adds a header and forwards the request to the analytics provider server. The analytics provider server processes the dynamic variable definition(s), obtaining values for variables from various data sources, and then forwards the collected data in the processed query string expression to the storage facility, e.g., a data warehouse. In this most general of the three examples, particular variables are not recited; we simply note that one or more variables are specified in the query string.

A second example refines the first example in one of many possible ways. In this second example, the HTTP request from the wireless device includes the query string expression with dynamic variables named User-Agent and X-Callingline-ID. At the point in the data flow between the wireless device and the wireless gateway, the request also includes a value for the User-Agent, e.g., "SomeCellPhone 1065". The wireless gateway adds an X-Callingline-ID header value "555-867-5309" to the request before forwarding the request to the analytics provider. The analytics provider inserts the indicated values into the expression and then forwards the collected data to the storage facility. At this level of example specificity, particular variables and their values have been recited, but no specific syntax is recited; any suitable syntax is sufficient.

In the most specific of these three examples, a query string in a particular syntax will now be recited. At the point between the wireless device and the wireless gateway, the query string is:

GET /track?a=12345&c1=[[X-Callingline-ID]]&c2=
   [[User-Agent]] HTTP/1.0
User-Agent: SomeCellPhone 1065

At the point between the wireless gateway and the analytics provider, the query string is:

GET /track?a=12345&c1=[[X-Callingline-ID]]&c2=
   [[User-Agent]] HTTP/1.0
User-Agent: SomeCellPhone 1065
X-Callingline-ID: 555-867-5309

After dynamic variable processing (interpretation) at the analytics provider, data sent to the analytics data storage facility in this third example is:

a=12345
c1=555-867-5309
c2=SomeCellPhone 1065

More generally, a web request typically contains a header, in addition to the "content" that is also sometimes referred to as the document body or the document content. The header fields provided in the header can vary depending on the client/gateway. For example, the WebCab dot de website (at webcab dot de slash wbhh dot xhtml) noted that as of July 2005, their product had logged 24,110 unique combinations of HTTP headers of 4,919 WAP browsers; as of June 2006, it had logged 33,939 unique combinations of HTTP headers of about 7500 WAP browsers. Many such header fields are not readily accessible via JavaScript.

Bearing the foregoing in mind, we now turn to a more detailed discussion of various aspects of some embodiments of the present invention.

Methods and More

Figure 1:
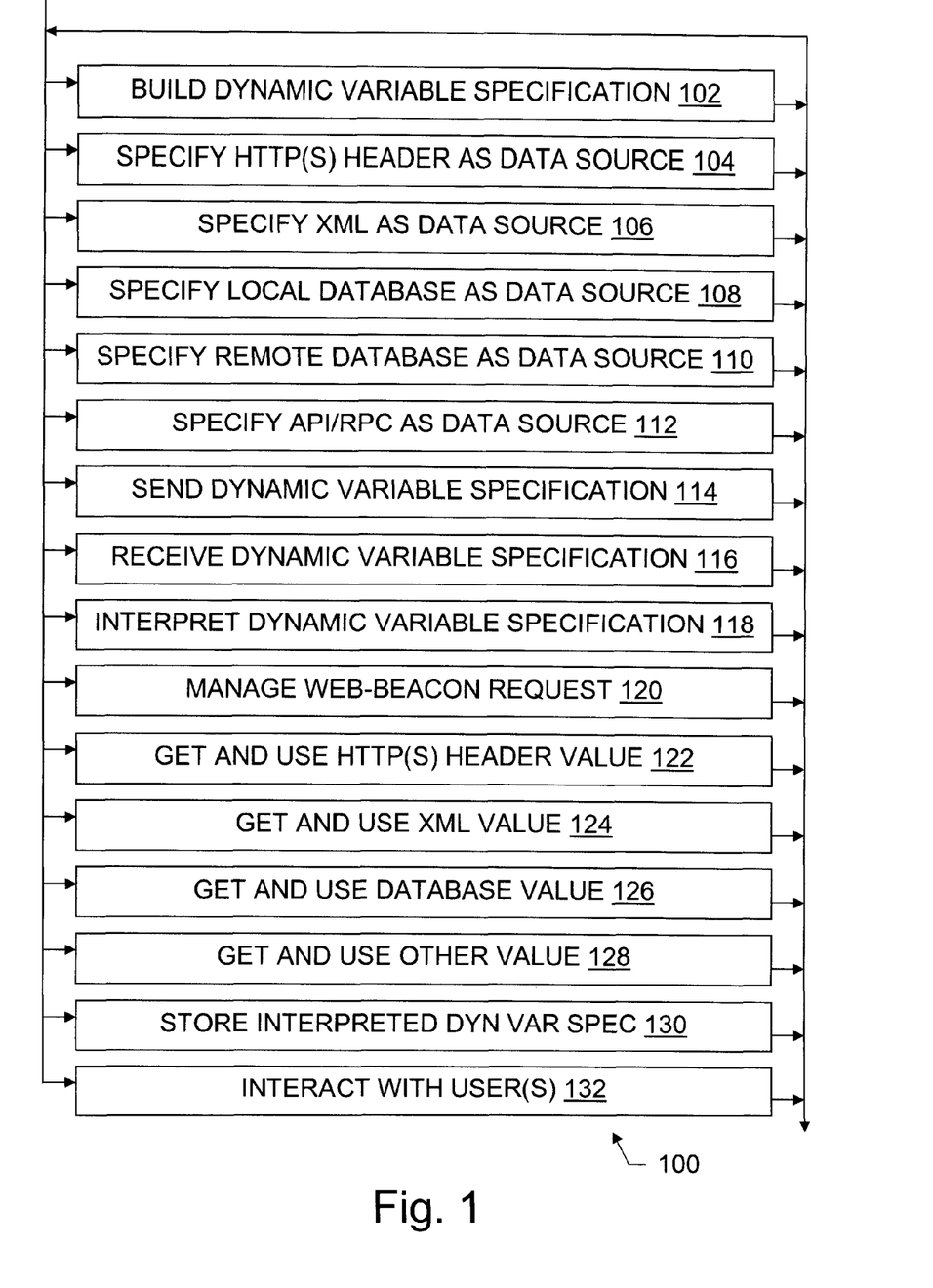
FIG. 1 is a flow chart illustrating methods of building, communicating, interpreting, and otherwise managing dynamic variable specifications, according to at least one embodiment of the present invention.

Flowchart 100 in FIG. 1 illustrates methods for managing dynamic variables in a web analytics system. The system may include cell phones and other wireless devices for reading information from the web or from other parts of the Internet and/or from a local network. As indicated by the flowchart arrows in FIG. 1, a given embodiment need not include every step of the flowchart 100 shown in the Figure, and steps may be performed in a different order than the top-to-bottom order that is laid out in the Figure. Steps may also be repeated, renamed, grouped differently, and otherwise depart from the Figure. In short, FIG. 1 and the other Figures do not override normal procedures for understanding patent claims; the Figures are meant instead to assist an understanding of the claimed invention.

Figure 2:
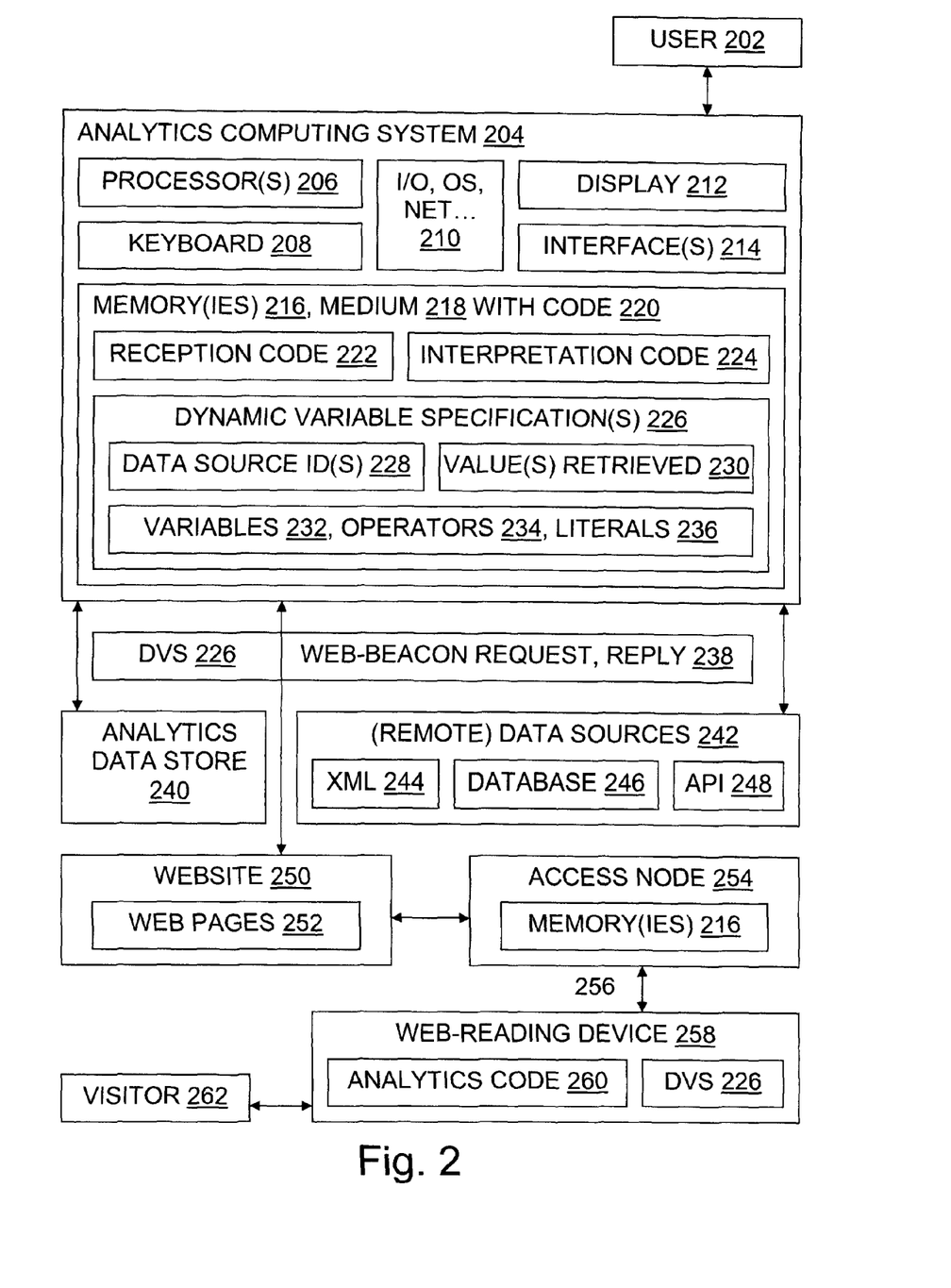
FIG. 2 is a block diagram illustrating systems, data flow, roles, components, and an operating environment according to at least one embodiment of the present invention.

During a dynamic variable specification building step 102, a dynamic variable specification 226 is built in a memory 216 of a web-reading device 258, such as a cell phone or personal digital assistant. A visitor 262 to a website 250 uses the device 258 to read web pages 252, via protocols such as HTML and RSS. Tools and techniques for building conventional webbeacon requests may be adapted for use in a given embodiment by adding code 260 to build 102 a query string which conforms with a syntax that contains designations for variable names 232 as discussed herein.

As one example, a particular syntax is provided below, but the invention is not limited to this particular syntax or to the examples herein. This example syntax contains designations for variable names 232, operators 234, and literals 236.

If the value of the variable begins with "[[" and ends with "]]" it is flagged as dynamic and is handled by the interpreter 224.

The query string between the "[[" and "]]" can contain variable names, quoted strings, and "+" operators to concatenate values.

Variable names are used to insert the value of another query string variable, HTTP header, or a special named value, using the same names in some embodiments that are supported by Omniture XML API tags, or the like.

Strings contained in quotes (" ") are inserted as the value that is within the quotes. The quoted strings may use escaping (\\ or \") to insert a backslash or a quote character. This is provided because quotes are a special character to tell the interpreter 224 that a quoted string is coming.

If more than one value is to be inserted to make up the new value, one can concatenate them with "+" operators.

For example:
Query-String Variables:
c1: foo
c2: bar
c3: [[c1]]
c4: [[c1+":"+c2]]
c5: [[User-Agent+" #"+X-Callingline-ID]]
c6: [[Prop1+"\\\"TEST\":"+Prop2]]
HTTP Headers:
User-Agent: Nokia 8600
X-Callingline-ID: 555-867-5309
Resulting Interpreted Dynamic Variables:
c3: foo
c4: foo:bar
c5: Nokia 8600 #555-867-5309
c6: foo\"TEST":bar Additional examples are given below, to further illustrate how an embodiment could allow one to collect information available in the HTTP headers or other locations.

This example illustrates the example syntax in general:
Query-String Variables:
   c1: foo
   c2: bar
   c3: [[c1]]
   c4: [[c1+":"+c2]]
   c5: [[User-Agent]]
   c6: [[Prop1+"\"foo\"\\\"bar\""+Prop2]]
HTTP Headers:
   User-Agent: Mozilla/4.0 (MSIE 5.0)
   X-Callingline-ID: 555-867-5309
Resulting Interpreted Dynamic Variables:
   c3: foo
   c4: foo:bar
   c5: Mozilla/4.0 (MSIE 5.0)
   c6: foo"foo"\"bar"bar The following example illustrates the example syntax as it might be used by an embodiment in a mobile device 258, such as a cell phone or a personal digital assistant.
Query-String Variables:
   c1: [[User-Agent]]
   c2: [[X-Callingline-ID]]
HTTP Headers:
   User-Agent: Nokia 8600
   X-Callingline-ID: 555-867-5309
Resulting Interpreted Dynamic Variables:
   c1: Nokia 8600
   c2: 555-867-5309

The following example illustrates the example syntax as it might be used by an embodiment in a device 258 which has an installed application, and in particular, which has an installed MP3 or other music player application.
Query-String Variables:
   c1: [[X-Player-Artist]]
   c2: [[X-Player-Album]]
   c3: [[X-Player-Track+"-"+X-Player-Title]]
HTTP Headers:
   X-Player-Artist: Pink Floyd X-Player-Album: The Wall
X-Player-Track: 02
X-Player-Title: The Thin Ice
Resulting Interpreted Dynamic Variables:
c1: Pink Floyd
c2: The Wall
c3: 02-The Thin Ice The following several examples illustrate the example syntax as it might be used by embodiments when a dynamic variable specification identifies data sources 242 other than, or in addition to, HTTP/HTTPS header data sources. First, an XML data source:

```
XML:
    c1: [ [XML.customer.name.last+",
"+XML.customer.name.first] ]
    c2: [ [XML.customer.contact.phone] ]
    products:
[ [";"+XML.customer.service(1) .name+";1;"+XML.customer.
service(1) .cost+", ;"+XML.customer.service(2) .name+";1;"+XML.
customer.service(2).cost] ]
    Posted XML:
        <customer>
            <name>
                <first>Bob</first>
                <last>Sacamano</last>
            </name>
            <contact>
                <phone>555-867-5309</phone>
            </contact>
            <service>
                <name>Thermal Flush</name>
                <cost>119.95</cost>
            </service>
            <service>
                <name>Capacitor Rebuild</name>
                <cost>245.18</cost>
            </service>
        </customer>
```

Next, a local database data source 242:
Database on Omniture (for example) server:
c1: [[DB(12345).lastName+","+DB(12345).firstName]]
where 12345 is the key to the database row In this example, the syntax for identifying 110 a remote database data source 242 is much the same as the syntax of the local database source 242 identified 108 in the previous example:
Database on remote customer server:
c1: [[RDB(1,12345).lastName+","+RDB(1,12345).firstName]]
where 1 is the # for the remote database the customer has setup with the analytics provider so that provider can get type (MySQL, Oracle, . . . ) and connection info (IP, login, etc. . . . ). Again 12345 is the key to the table row sought.

Finally, two examples of API data sources 242:
Special partners known to Omniture (for example) which have coded APIs:
c1: [[MYADSVR(456,789).lastImp]]
where 456 is the ad-serving client ID and 789 is the visitor ID the ad-server knows about lastImp would be a variable specific to this partner that gets the ID of the last ad the visitor saw (this is used to calculate view throughs)
c1: [[BGBRTHR(768).salaryRng]]
c2: [[BGBRTHR(768).netUsagePerWk]]
where 768 is the visitor ID Big Brother knows about and salaryRng and netUsagePerWk are variables to get profile info about the visitor Implementing a syntax shown herein, or its like, together with its interpretation in a data collection engine, can provide a flexible method of collecting data. Customers 202 could see fewer (if any) limitations based on the inaccessibility of data from JavaScript at web page 252 run-time; such inaccessibility being a result of using WAP and its lack of an embedded scripting language. Customers 202 could also have fewer or no hassles due to hard-coding which header variables should be placed in which tracking variables through some server-side configuration. In this context "hard-coded" is the same as "static", as far as variables are concerned.

Rather, through an interface one could designate 132 the data source and field-name 228 in JavaScript. An Omniture or other authorized analytics provider data collection engine could access 122-128 that data source and field-name value to dynamically populate tracking variables 232. Getting and using values during any of steps 122-128 may be considered part of the interpretation 118 of a given dynamic variable specification 226. Some examples of data sources 242 are HTTP/HTTPS headers, posted XML, databases, and a custom analytics service provider API. This innovation could be used by customers who wish to track 120 additional information available in headers or other device mechanisms not accessible at web page run-time. For example, wireless device 258 providers could utilize it.

During a header as data source specifying step 104, which may be part of query string building step 102, at least one HTTP or HTTPS header field is specified as a data source 228 in the dynamic variable specification. For instance, "User-Agent" and "X-Callingline-ID" HTTP header fields are specified in an example above.

During an XML as data source specifying step 106, which may be part of query string building step 102, at least one XML file, XML record, or other XML structure is specified as a data source 228 in the dynamic variable specification. For instance, "XML.customer" fields are specified in examples above.

During a local database as data source specifying step 108, which may be part of query string building step 102, at least one local database is specified as a data source 228 in the dynamic variable specification. For instance, "DB(12345).lastName" is specified in an example above.

During a remote database as data source specifying step 110, which may be part of query string building step 102, at least one remote database is specified as a data source 228 in the dynamic variable specification. For instance, "RDB(1,12345).lastName" is specified in an example above.

During an API as data source specifying step 112, which may be part of query string building step 102, at least one application program interface, remote procedure call, object method invocation, or other call to a remote function or procedure is specified as a data source 228 in the dynamic variable specification. For instance, "MYADSVR(456,789).lastImp" is specified in an example above.

During a dynamic variable specification sending step 114, a copy of the dynamic variable specification is sent across a network link 256 from a web-reading device 258 such as a cell phone to an access node 254 such as a wireless gateway. This transmission may be done using one or more wireless communication protocols such as WAP, J2ME, I-mode, LEAP, EZWeb, and J-SkyWeb. In some embodiments, the web-reading device 258 is not a wireless device, and protocols such as HTTP or HTTPS are used to send 114 the dynamic variable specification from the web-reading device 258 to a gateway 254.

During a dynamic variable specification receiving step 116, a copy of the dynamic variable specification is received at the access node 254 from the web-reading device 258. This is accomplished using wireless (WAP etc.) or wired (HTTP etc.) transmission protocols, according to the particular embodiment. This query string and dynamic variable specification, possibly expanded or otherwise modified by code 220 running on the access node 254, can then be forwarded 114 from the access node toward an analytics server 204, by using wired protocols and/or other familiar network transmission tools and techniques. Reception code 222 on the analytics server 204 receives 116 the dynamic variable specification 226.

During a dynamic variable specification interpreting step 118, an interpreter 224 parses the dynamic variable specification, identifying within it variables 232 having data source identifiers 228, operators 234, and literals 236. A given embodiment's syntax need not support operators or literals. Even if they are supported, a given string 226 need not contain operators or literals. Conversely, additional program language constructs may also be supported in some web-beacon dynamic variable specifications, in some embodiments. Variables in the dynamic variable specification have corresponding data sources 228, which are either implicit (e.g., based on variable name) or stated explicitly (e.g., when a database is named 108, 110). During the interpretation 118, the data source is identified and then accessed by the interpreter 224, a value 230 is obtained from the data source, and the value is then assigned to the variable 232. This may involve copying 122 HTTP header data from within the web-beacon request, accessing 124 a local or remote XML file, accessing 126 a local or remote database, and/or invoking 128 a local or remote procedure or function, for example. These steps may overlap; an API may be used to access a database, for example.

During an interpreted dynamic variable specification storing step 130, at least a portion of the interpretation 118 step results is stored in a data warehouse or other analytics data storage facility 240. The stored data can then be accessed 132 and/or analyzed 132 later, using tools such as appropriately extended versions of Omniture SiteCatalyst™ or the like, to help provide users 202 with a better understanding of visitor 262 behavior when a website 250 is read using wireless devices or other devices 258.

As an additional example, some embodiments provide a web analytics method including the steps of: a web-reading device 258 sending 114 an access node 254 a web-beacon request 238 associated with a dynamic variable specification 226; the access node 254 forwarding 114 to an analytics data collection server 204 the web-beacon request 238 and the dynamic variable specification 226; and the analytics data collection server 204 interpreting 118 the dynamic variable specification 226. In some methods, a wireless web device 258 sends 114 a wireless access node 254 a web-beacon request 238 associated with a dynamic variable specification 226, and the wireless access node 254 forwards 114 to the analytics data collection server 204 the web-beacon request 238 and the dynamic variable specification 226. In some, the dynamic variable specification 226 specifies 104-112 at least one of the following as a data source 228: an HTTP/HTTPS header, posted XML, a database, a custom analytics service provider API.

In some cases, interpreting 118 the dynamic variable specification 226 includes obtaining 126 a data value 230 from a database 246 as a local or remote data source 242 and assigning that data value to a variable 232 which is identified 118 in the dynamic variable specification 226. In some cases, interpreting 118 the dynamic variable specification 226 includes obtaining 124 a data value 230 from an XML record 244 as a data source 242 and assigning that data value to a variable 232 which is identified 118 in the dynamic variable specification 226. In some cases, interpreting 118 the dynamic variable specification 226 includes obtaining 124 a data value 230 from an API 248 as a data source 242, whether by remote procedure call, object method call, or other invocation mechanism, and then assigning that data value to a variable 232 which is identified 118 in the dynamic variable specification 226. Some methods further include storing 130 an interpreted dynamic variable specification 226, e.g., a set of collected values 230, in an analytics data facility 240. Some further include building 102 the dynamic variable specification 226 before the web-reading device 258 sends 114 the dynamic variable specification 226 to the access node 254.

Some embodiments provide a web analytics method including the steps of: a wireless access node 254 receiving 116 a web-beacon request 238 including a dynamic variable specification 226; and the wireless access node 254 forwarding 114 to an analytics data collection server 204 the web-beacon request 238 including the dynamic variable specification 226. In some cases, the dynamic variable specification 226 specifies 104-112 at least one of the following as a data source 228: an HTTP/HTTPS header, posted XML, a database, a custom API.

Configured Media

Some embodiments include a computer-readable storage medium 218 such as a flash memory, CD, DVD, removable drive, hard drive, RAM, ROM, EEPROM, PAL, ASIC, FPGA, or the like, which is configured to work in conjunction with a processor 206 to perform a process for dynamic variable web usage tracking, and/or dynamic variable wireless web usage tracking, as discussed herein. It will be understood that method embodiments and configured media embodiments are generally closely related, in the sense that many methods discussed in conjunction with FIG. 1 can be implemented using code 220 that configures a medium 218, and that many configured media 218 are configured by code 220 which performs such a method. Note also that memories 216 in an analytics server 204, in a proxy, intermediate node, or other access node 254, and/or in a web-reading device 258, may be configured media 218 in a given embodiment, in addition to or in lieu of removable media such as DVDs, etc. The interpreter code 224 and the dynamic variable specification building code 260 are examples of code 220 that configures a computer-readable storage medium 218.

Systems and More

FIG. 2 illustrates system embodiments, as well as further illustrating methods, data used and results produced, and a context for embodiments. As with FIG. 1, items depicted in FIG. 2 may be omitted, repeated, grouped differently, connected differently, and/or renamed (for example) in a given embodiment.

A user 202, such as a web analytics service recipient, interacts 132 with a computing system 204 that is configured with code 220 to perform methods such as those discussed above. The computing system 204 includes one or more processors 206 which operate in communication with various memories 216 (RAM, ROM, disk, removable media, and so on) to provide functionality discussed herein. The illustrated system 204 also has peripherals such as a keyboard 208 and display 212, as part of interfaces 214 with users 202. Other interface 214 hardware and software may communicate with data sources such as a remote database 240 of web analytics data. Components 210 such as an operating system and networking support are also shown in the illustrated system 204.

Configuring the system 204 are one or more pieces of code 220, "code" being a term which includes digital data structures and/or instructions to guide operation of a processor. The code 220 configures the memory(ies) 216, 218, thereby distinguishing the computing system 204 from systems intended for use(s) other than the management of dynamic variable specifications as described herein. As with other portions of the Figures, the code 220 shown is illustrative, not definitive, in that a given embodiment may omit, repeat, regroup, reorganize, and/or rename the code 220 components (reception code 222, interpretation code 224, dynamic variable specification 226 components 228-236) that are shown in this Figure.

Computers, PDAs, cell phones, and any device 258 having user interface 214 and phone/computer network transmission capabilities may be part of a given embodiment. Touch screens, keyboards. other buttons, levers, microphones, speakers, light pens, sensors, scanners, and other I/O devices 210 may be configured to facilitate or perform operations to achieve the methods and systems, and the method results, which are described here. The access node 254 may be a gateway, a wireless gateway, or a proxy, for example. Combinations of these items may also form a given embodiment.

Some embodiments provide a web analytics system, including: a processor 206; a memory 216 which is interoperable with the processor 206; reception code 222 configuring the memory 216 and capable of controlling the processor 206 to make the system 204 receive 116 a web-beacon request 238 which has an associated dynamic variable specification 226; and interpretation code 224 configuring the memory 216 and capable of controlling the processor 206 to make the system 204 interpret 118 the dynamic variable specification 226. Some embodiments further include a wireless web-reading device 258 on which the dynamic variable specification 226 was at least partially created 102. In some, the wireless web-reading device 258 includes at least one of: a cell phone, a mobile phone, a handheld computer, a personal digital assistant, an electronic handheld unit for wireless receipt of data, a mobile digital electronic device. In some cases, the wireless web-reading device 258 is configured with code 260 which is written at least partially in an embedded scripting language and which is capable of least partially creating 102 the dynamic variable specification 226.

Some embodiments further include a dynamic variable specification 226, in which the dynamic variable specification 226 specifies 104-112 at least one of the following as a data source 228: an HTTP/HTTPS header, a piece of XML code 244, a database 246, an API 248. Some embodiments further include an analytics data collection server 204, and the processor 206 and memory 216 are part of the analytics data collection server 204. Some include an analytics data facility 240 configured with data 230 from at least one interpreted 118 dynamic variable specification 226.

Some embodiments include the dynamic variable specification 226, and are embodiments wherein the dynamic variable specification 226 conforms with a syntax that contains designations for variable names 232 but not necessarily for literals or for operators. In other embodiments, the dynamic variable specification conforms with a syntax that contains designations for variable names 232, for operators 234 such as the string concatenation operator or other operators used in programming languages, and for literals 236. In some embodiments, the interpretation code 224 is capable of accessing a remote database 246, an XML record 244, an API 248, and/or another data source 242 which is located outside the dynamic variable specification 226 but is identified 228 in the dynamic variable specification 226. The interpretation code 224 obtains one or more values, and assigns the obtained value(s) 230 to one or more dynamic variables 232 identified in the dynamic variable specification 226.

Additional Information

Although one may focus on the invention in the context of mobile devices, some embodiments may also be used in other contexts, e.g., when applications want to send data 230 to an analytics server provider 204 but cannot easily manipulate the query string 238 or when they have the data 230 in another location. Query string manipulation may be difficult, for example, in wireless devices 258 viewing WAP pages when there is no embedded scripting language (e.g., JavaScript in a browser or ActionScript in a Flash presentation) to use for building the query string. Some examples of other locations for data include XML 244 posted with the beacon request 238, a database table 246 hosted by the analytics provider or by the customer or at another location, and a custom application program interface 248 supported by the analytics provider. With the invention, a system could have a static query string that defines the dynamic portions to be pulled from the HTTP headers and/or other locations such as these. Variables may also access the HTTP header namespace on the device making the beacon request. The HTTP header variables could be passed by a browser on a PC, a browser on a wireless device, or a custom application that makes HTTP requests, for example.

"Computer" refers to devices having at least one microprocessor 206 and at least one memory 216, not merely to personal computers or servers. "Electronic" refers to digital and/or analog electronic circuitry. "Automatic" means without requiring ongoing real-time human input or guidance to perform the immediately contemplated operation; in a particular embodiment, any or all of the steps called for may be automatic steps.

Although JavaScript is presently used widely, embodiments may also be implemented at least in part with web-reading device analytics code 260, access node code 220, and/or server code 222, 224 that is written in ActionScript, VBScript, C++, Java, XML, Perl, and/or another programming or scripting language, or in a combination of languages, except as otherwise required by operability or claim limitations.

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products such as dynamic variable specifications 226 and values 230 sent to storage 240 as a result of interpreting 118 dynamic variable specifications 226. Limitations from one embodiment are not necessarily read into another.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, JavaScript code, as well as other scripting languages, HTML, XML, APIs, SDKs, network protocol stacks, assembly language, firmware, microcode, compilers, debuggers, and/or other languages and tools.

Any website address, and the material on the websites thus addressed, are provided only for background and/or as examples to help illustrate the invention. This document does not incorporate by reference any essential material from such websites.

The embodiments discussed are illustrative of the application for the principles of the present invention. Numerous modifications and alternative embodiments can be devised without departing from the spirit and scope of the present invention.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic. Any apparent inconsistencies in the text associated with a given reference number should be interpreted to broaden to meaning of that reference number.

We claim:

1. A web analytics method, comprising:
    building, at least partially at a web-reading device, a dynamic variable specification comprising identification of:
    one or more dynamic data variables; and
    for each of the one or more dynamic data variables, a data source from which to collect a data value corresponding to the respective dynamic data variable identified;
    subsequent to said building, transmitting, from the web-reading device to an access node, a web-beacon request indicated in a web page read on the web-reading device, wherein the web-beacon request includes the dynamic variable specification to report analytics data pertaining to the web page to an analytics data collection server, wherein a value for at least one of the one or more dynamic data variables is not included in the web-beacon request from the web-reading device;
    wherein the access node is configured to forward, to an analytics data collection server, the web-beacon request including the dynamic variable specification; and
    wherein the analytics data collection server is configured to interpret the dynamic variable specification, and wherein interpreting the dynamic variable specification comprises:
    collecting, from the data source identified by the dynamic variable specification, the data value corresponding to each of the one or more dynamic data variables identified; and
    assigning each data value collected to the corresponding dynamic data variable identified.

2. The method of claim 1, wherein the web-reading device comprises a wireless web device.

3. The method of claim 1, wherein the dynamic variable specification specifies at least one of the following as a data source: an HTTP/HTTPS header, posted XML, a database, a custom analytics service provider API.

4. The method of claim 1, wherein collecting the data value corresponding to the dynamic data variable identified comprises obtaining a data value from a database.

5. The method of claim 1, wherein collecting the data value corresponding to the dynamic data variable identified comprises obtaining a data value from an XML record.

6. The method of claim 1, further comprising storing, in an analytics data facility, the data value collected in association with the corresponding dynamic data variable identified.

7. A web analytics method, comprising:
    a wireless access node receiving, from a web-reading device, a web-beacon request and a dynamic variable specification,
    wherein the dynamic variable specification was built, at least partially, at the web-reading device for inclusion in a transmission of the web-beacon request, and
    wherein the dynamic variable specification comprises identification of:
    one or more dynamic data variables; and
    for each of the one or more dynamic data variables, a data source from which to collect a data value corresponding to the respective dynamic data variable identified;
    the wireless access node forwarding, to an analytics data collection server, the web-beacon request indicated in a web page read on the web-reading device, wherein the web-beacon request includes the dynamic variable specification to report analytics data pertaining to the web page to an analytics data collection server, wherein a value for at least one of the one or more dynamic data variables is not included in the web-beacon request from the web-reading device, wherein the analytics data collection server is configured to interpret the dynamic variable specification, and wherein interpreting the dynamic variable specification comprises:
    collecting, from the data source identified by the dynamic variable specification, the data value corresponding to each of the one or more dynamic data variables identified; and
    assigning each data value collected to the corresponding dynamic data variable identified.

8. The method of claim 7, wherein the dynamic variable specification specifies an HTTP/HTTPS header as a data source, wherein the wireless access node comprises a wireless gateway, and wherein the wireless gateway generates and forwards to the analytics data collection server, a header value comprising the data value.

9. A web analytics server system, comprising:
    a processor;
    a memory which is interoperable with the processor;
    reception code configuring the memory and capable of controlling the processor to make the server system receive a web-beacon request and a dynamic variable specification,
    wherein the dynamic variable specification was built, at least partially, at a web-reading device for inclusion in a transmission of the web-beacon request, and
    wherein the dynamic variable specification comprises identification of: one or more dynamic data variables; and
    for each of the one or more dynamic data variables, a data source from which to collect a data value corresponding to the respective dynamic data variable identified; and
    interpretation code configuring the memory and capable of controlling the processor to cause the server system to interpret the dynamic variable specification, wherein interpreting the dynamic variable specification comprises:
    collecting, from the data source identified by the dynamic variable specification, the data value corresponding to each of the one or more dynamic data variables identified; and assigning each data value collected to the corresponding dynamic data variable identified.

10. The system of claim 9, wherein the web-reading device comprises at least one of: a cell phone, a mobile phone, a handheld computer, a personal digital assistant, an electronic handheld unit for wireless receipt of data, a mobile digital electronic device.

11. The system of claim 9, wherein the web-reading device is configured with code which is written at least partially in an embedded scripting language and which is capable of least partially creating the dynamic variable specification.

12. The system of claim 9, wherein the dynamic variable specification specifies at least one of the following as a data source: an HTTP/HTTPS header, a piece of XML code, a database, an API.

13. The system of claim 9, further comprising an analytics data collection server comprising the processor and memory.

14. The system of claim 9, further comprising an analytics data facility configured to store the data value collected in association with the corresponding dynamic data variable identified.

15. The system of claim 9, wherein the dynamic variable specification conforms with a syntax that contains designations for variable names.

16. The system of claim 9, wherein the dynamic variable specification conforms with a syntax that contains designations for variable names, operators, and literals.

17. The system of claim 9, wherein collecting the data value corresponding to the dynamic data variable identified comprises obtaining a value from a remote database.

18. The system of claim 9, wherein collecting the data value corresponding to the dynamic data variable identified comprises obtaining a data value from an XML record.

* * * * *